(12) United States Patent
Pai

(10) Patent No.: US 7,589,870 B2
(45) Date of Patent: Sep. 15, 2009

(54) DUAL-MODE SCANNER CAPABLE OF PERFORMING TRANSMISSIVE AND REFLECTIVE SCANNING WITH SINGLE SIDE LAMP

(76) Inventor: Nien-Hua Pai, 669, Ruey Kuang Road, Neihu, Taipei (TW) 114

( * ) Notice: Subject to any disclaimer, the term of this patent is extended or adjusted under 35 U.S.C. 154(b) by 1044 days.

(21) Appl. No.: 10/827,483

(22) Filed: Apr. 19, 2004

(65) Prior Publication Data

US 2005/0036178 A1    Feb. 17, 2005

(30) Foreign Application Priority Data

Aug. 13, 2003    (TW) .............................. 92122297 A

(51) Int. Cl.
*H04N 1/04*    (2006.01)
(52) U.S. Cl. .................. 358/474; 358/487; 358/475; 358/494; 362/602
(58) Field of Classification Search ............ 358/474, 358/487, 501, 505, 475, 509, 471, 488; 359/197; 250/234; 362/602
See application file for complete search history.

(56) References Cited

U.S. PATENT DOCUMENTS

| | | | | |
|---|---|---|---|---|
| 5,574,274 A * | 11/1996 | Rubley et al. | ............. | 250/208.1 |
| 5,625,469 A * | 4/1997 | Wheeler et al. | ............. | 358/487 |
| 5,696,609 A * | 12/1997 | Cresens et al. | ............. | 358/475 |
| 5,705,805 A * | 1/1998 | Han | ............. | 250/208.1 |
| 5,710,643 A * | 1/1998 | Depiano | ............. | 358/487 |
| 5,751,447 A * | 5/1998 | Brook et al. | ............. | 358/487 |
| 5,814,809 A * | 9/1998 | Han | ............. | 250/208.1 |
| 5,844,697 A * | 12/1998 | Omvik et al. | ............. | 358/487 |
| 6,304,358 B1 * | 10/2001 | Lin et al. | ............. | 359/196 |
| 6,567,191 B1 * | 5/2003 | Huang | ............. | 358/487 |
| 6,621,603 B2 * | 9/2003 | Han | ............. | 358/487 |
| 6,707,583 B1 * | 3/2004 | Tsai et al. | ............. | 358/497 |
| 6,788,439 B2 * | 9/2004 | Lu et al. | ............. | 358/487 |
| 7,057,777 B2 * | 6/2006 | Fang et al. | ............. | 358/475 |
| 2005/0259436 A1 * | 11/2005 | Wang et al. | ............. | 362/602 |

FOREIGN PATENT DOCUMENTS

| | | |
|---|---|---|
| CN | 2280391 Y | 4/1998 |
| CN | 2547076 Y | 4/2003 |
| JP | 63221765 | 9/1988 |
| JP | 01126772 | 5/1989 |
| JP | 03143072 | 6/1991 |
| JP | 04140960 | 5/1992 |

(Continued)

*Primary Examiner*—Edward L Coles
*Assistant Examiner*—Negussie Worku
(74) *Attorney, Agent, or Firm*—Workman Nydegger

(57) ABSTRACT

A dual-mode scanning apparatus is capable of scanning both transmissive and reflective objects. An opaque object or a light-transmissible object is placed on the scanning platform when either of the reflective or transmissive scanning modes is performed. The carriage module is arranged under the scanning platform, and has therein an active light source for emitting light. The light emitted by the active light source is reflected by the opaque object to enter the carriage module in the reflective scanning mode. On the other hand, a light-guiding member arranged over the scanning platform guides the light emitted by the active light source to the light-transmissible object. The light penetrates through the object to enter the carriage module in the transmissive scanning mode.

20 Claims, 7 Drawing Sheets

FOREIGN PATENT DOCUMENTS

| | | |
|---|---|---|
| JP | 05005959 | 1/1993 |
| JP | 05199369 | 8/1993 |
| JP | 07085206 | 3/1995 |
| JP | 07135553 | 5/1995 |
| JP | 09018658 | 10/1997 |
| JP | 09321957 | 12/1997 |
| JP | 10065845 | 3/1998 |
| JP | 11040960 | 2/1999 |
| JP | 11266346 | 9/1999 |
| JP | 031777479 | 6/2003 |

* cited by examiner

DUAL-MODE SCANNER CAPABLE OF PERFORMING TRANSMISSIVE AND REFLECTIVE SCANNING WITH SINGLE SIDE LAMP

FIELD OF THE INVENTION

The present invention relates to a scanning apparatus, and more particularly to a scanning apparatus performing transmissive and reflective scanning operations with a single side light source.

BACKGROUND OF THE INVENTION

Scanners are widely used to process image information into digital forms. Scanners are generally classified as two major types: transmissive scanners and reflective scanners for scanning opaque and transparent objects, respectively. Examples of the opaque objects include paper sheets, photographs, etc., and the common transparent objects are for example slides and films. For capable of scanning both opaque and transparent objects, a dual-mode scanner for optional transmissive/reflective scanning was developed. Referring to FIG. 1, a conventional dual-mode scanner is schematically shown. When the scanner is operated in the reflective mode, light emitted by a lamp 12 positioned at the same side as the carriage module 11, i.e. in the lower housing 101 of the scanner, is projected onto the surface of the opaque object 14 to be scanned. The light reflected from the opaque object 14 is then transmitted into the carriage module 11 to be processed. The reflected optical signal indicative of the image information is converted into an electric signal via a photoelectric conversion device (not shown) in the carriage module 11, and then the electric signal is further processed digitally. When the scanner is operated in the transmissive mode, light is emitted by a lamp 13 positioned at opposite side to the carriage module 11, i.e. in the upper housing or cover 102 of the scanner. The light penetrates through the transparent object 15 to be scanned, and then received by the carriage module 11 to be converted into an electric signal. Then, the electric signal is outputted to a processing device (not shown) such as a computer to be processed digitally.

As understood in the above description, there are two lamps 12 and 13 positioned at both sides of the scanning platform 16 required. If the opaque object 14 is being scanned, only the reflective lamp 12 is turned on. The light emitted from the lamp 12 is projected onto the surface of the opaque object 14, and reflected from the opaque object 14 into the carriage module 11 to be converted into an electric signal. On the contrary, if it is the transparent object 15 to be scanned, only the lamp 13 is turned on. The light emitted from the lamp 13 passes through the transparent object 15 to be received by the carriage module 11 and converted into an electric signal.

Since the above mentioned dual-mode scanner needs two individual lamps, the cost and the size thereof are undesirably high.

SUMMARY OF THE INVENTION

The present invention provides a dual-mode scanning apparatus using a singe light source to perform both transmissive and reflective scanning so as to reduce cost as well as size of the scanning apparatus.

The present invention also provides a dual-mode scanning apparatus using segmental lamps as the single light source, which are selectively turned on depending on transmissive or reflective scanning.

In accordance with a first aspect of the present invention, there is provided a dual-mode scanning apparatus capable of scanning both transmissive and reflective objects. The dual-mode scanning apparatus comprises a scanning platform, a carriage module and a light-guiding member. The scanning platform is used for placing thereon an object to be scanned. The carriage module is arranged under the scanning platform, and comprises an active light source for emitting light. The light is reflected by the object to enter the carriage module in a reflective scanning mode. The light-guiding member is arranged over the scanning platform for guiding the light emitted by the active light source to the object. The light penetrates through the object to enter the carriage module in a transmissive scanning mode.

In an embodiment, the scanning platform is transparent.

In an embodiment, the active light source is a linear lamp.

In an embodiment, the active light source is a U-shaped lamp.

In an embodiment, the object is placed at a designated region on the scanning platform in the transmissive scanning mode.

In an embodiment, the carriage module further comprises a light mask covering a portion of the active light source corresponding to the designated region in the transmissive scanning mode in order to prevent the object from direct illumination of the active light source.

In an embodiment, the object is positioned with a holder that is attachable to and detachable from the designated region of the scanning platform.

In an embodiment, the active light source comprises a plurality of segmental illuminating units, at least one of which is positioned corresponding to the designated region and turned off in the transmissive scanning mode in order to prevent the object from direct illumination of the active light source.

In an embodiment, the plurality of illuminating units are arranged as a linear light source.

In another embodiment, the plurality of illuminating units are arranged as a U-shaped light source.

In an embodiment, the light-guiding member comprises at least one reflective element and a light-guiding plate. The at least one reflective element is used for reflecting the light emitted by the active light source in a specified direction. The light-guiding plate is arranged in the specified direction relative to the reflective element for receiving the light emitted by the active light source and reflected by the reflective element, and scattering the light to penetrate through the object in the transmissive scanning mode.

Preferably, the dual-mode scanning apparatus is a scanner.

Preferably, the dual-mode scanning apparatus is a multi-function peripheral machine.

In accordance with a second aspect of the present invention, there is provided a dual-mode scanning apparatus capable of scanning both transmissive and reflective objects. The dual-mode scanning apparatus comprises a scanning platform, a carriage module and a light-guiding member. The scanning platform is used for placing thereon an object to be scanned. The carriage module is arranged under the scanning platform, and comprises an active light source for emitting light. The light is reflected by the object to enter the carriage module in a reflective scanning mode. The light-guiding member is arranged over the scanning platform for guiding the light emitted by the active light source to the object. The light penetrates through the object to enter the carriage module in a transmissive scanning mode. The active light source includes a first portion positioned under a light inlet of the light-guiding member and a second portion positioned under the object. Substantially only the light emitted from the first portion of the active light source penetrates through the scanning platform in the transmissive scanning mode.

In an embodiment, the carriage module further comprises a light mask moving to cover the second portion of the active light source in the transmissive scanning mode while moving to expose the second portion of the active light source in the reflective scanning mode.

In an embodiment, the second portion of the active light source is turned off in the transmissive scanning mode while being turned on in the reflective scanning mode.

In an embodiment, the first portion of the active light source includes at least one illuminating unit, and the second portion of the active light source includes at least two illuminating units positioned at opposite sides of the first portion.

In an embodiment, the light-guiding member comprises at least one reflective element and a light-guiding plate. The at least one reflective element serves as the light inlet for receiving and then reflecting the light emitted by the active light source in a specified direction. The light-guiding plate is arranged in the specified direction relative to the reflective element for receiving the light emitted by the active light source and reflected by the reflective element, and scattering the light to penetrate through the object.

In accordance with a third aspect of the present invention, there is provided a dual-mode scanning apparatus capable of scanning both transmissive and reflective objects. The dual-mode scanning apparatus comprises a scanning platform, a carriage module, a light inlet and a light-guiding member. The scanning platform is used for placing thereon an object to be scanned. The carriage module is arranged under the scanning platform, and comprises an active light source for emitting light. The light is reflected by the object to enter the carriage module in a reflective scanning mode. The light inlet is for receiving and then reflecting the light emitted by the active light source in a specified direction. The light-guiding element is arranged in the specified direction relative to the reflective element for receiving the light emitted by the active light source and reflected by the reflective element, and scattering the light to penetrate through the object to enter the carriage module in the transmissive mode. The active light source includes at least three illuminating units, and a middle one of the three illuminating units is turned off in the transmissive scanning mode in order to prevent the object from direct illumination of the active light source.

In an embodiment, the light inlet is a reflective mirror, and the light-guiding element is a light-dispersion plate.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
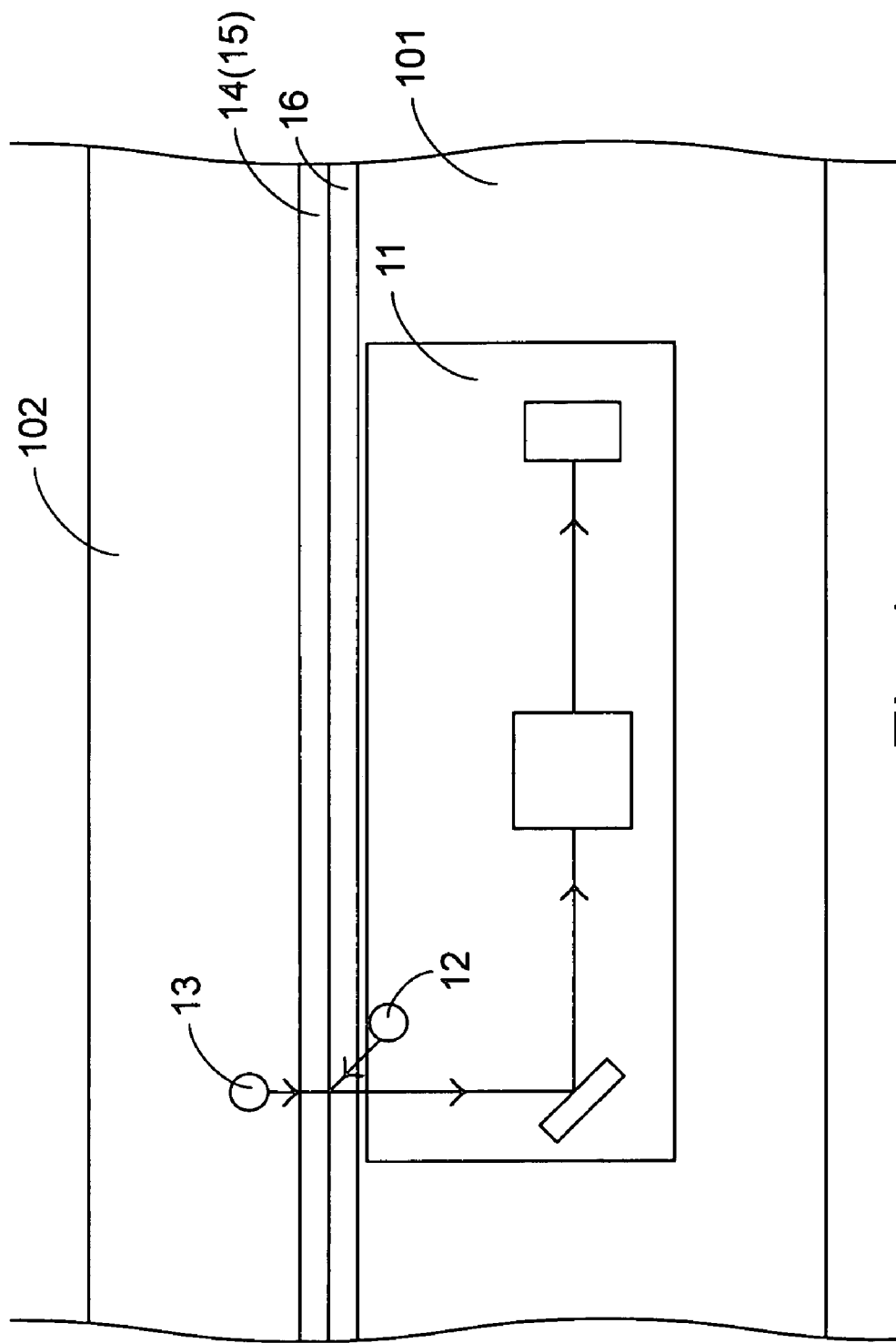
FIG. 1 is a schematic diagram showing an optical system of a conventional dual-mode scanner.
Figure 2:
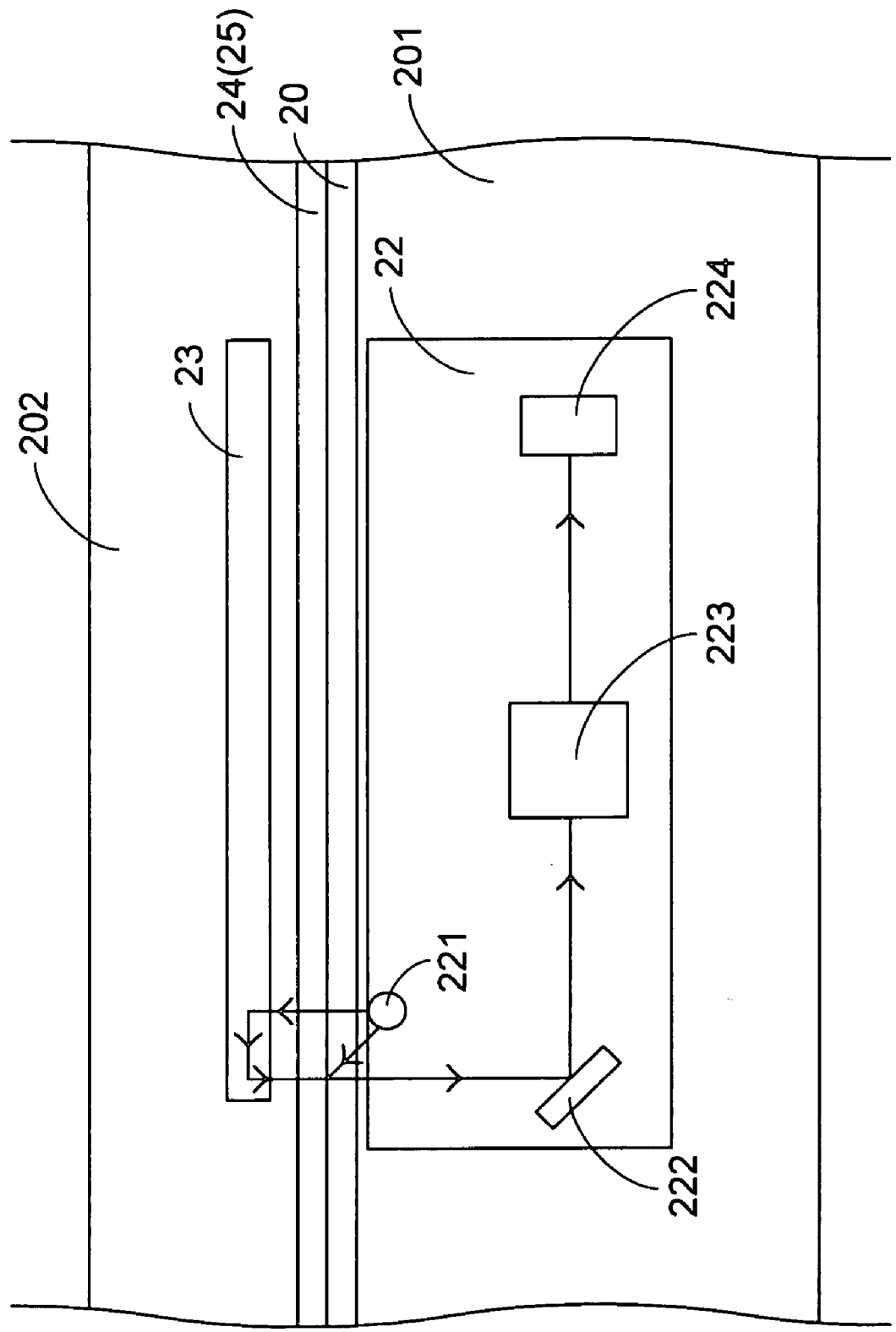
FIG. 2 is a schematic diagram showing an optical system of a dual-mode scanner according to a preferred embodiment of the present invention.

Referring to FIG. 2, a schematic view of a dual-mode image scanner according to a preferred embodiment of the present invention is shown. The dual-mode scanner comprises a carriage module 22 in the lower housing 201, which has therein optical elements including an active light source 221, a reflective mirror set 222, a lens set 223 and a photoelectric conversion device 224 such as a charge coupled-device (CCD). When the dual-mode scanner is operated in the reflective mode, the light emitted by the active light source 221 positioned in the carriage module 22 is projected onto the opaque object 24 placed on the scanning platform 20. The light reflected from the opaque object 24 is then transmitted into the carriage module 22 to be processed. The dual-mode image scanner further comprises a light-guiding member 23 in the upper housing 202. When the scanner is operated in the transmissive mode, the light emitted from the active light source 221 penetrating through the scanning platform 20 and is guided by the light-guiding member 23 to the light transmissible or transparent object 25 placed on the scanning platform 20. The light penetrating through the scanned object 25 then enter the carriage module 22 to be further processed.

Figure 3A:
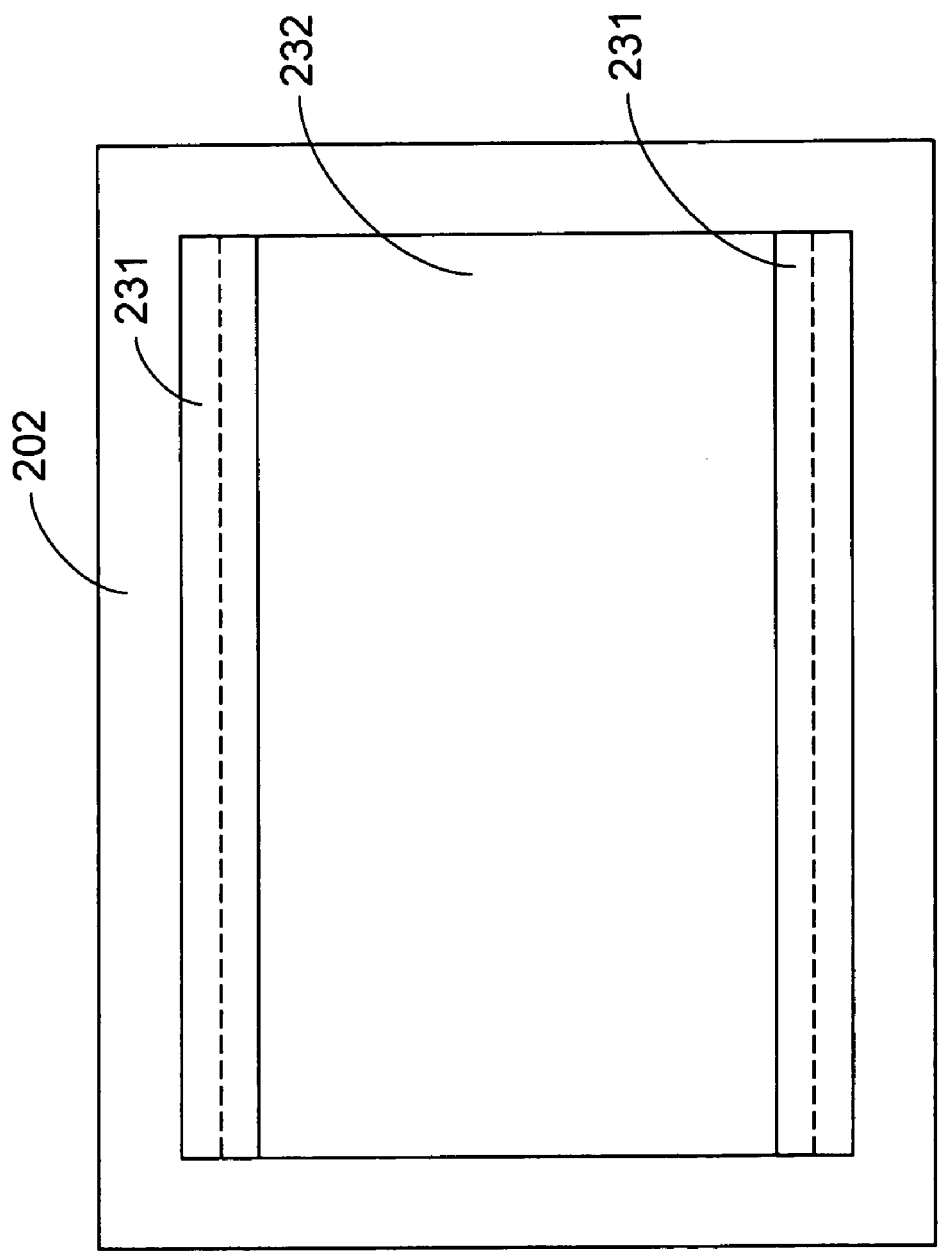
FIG. 3(a) is a schematic top view of an image scanner having a light-guiding member.
Figure 3B:
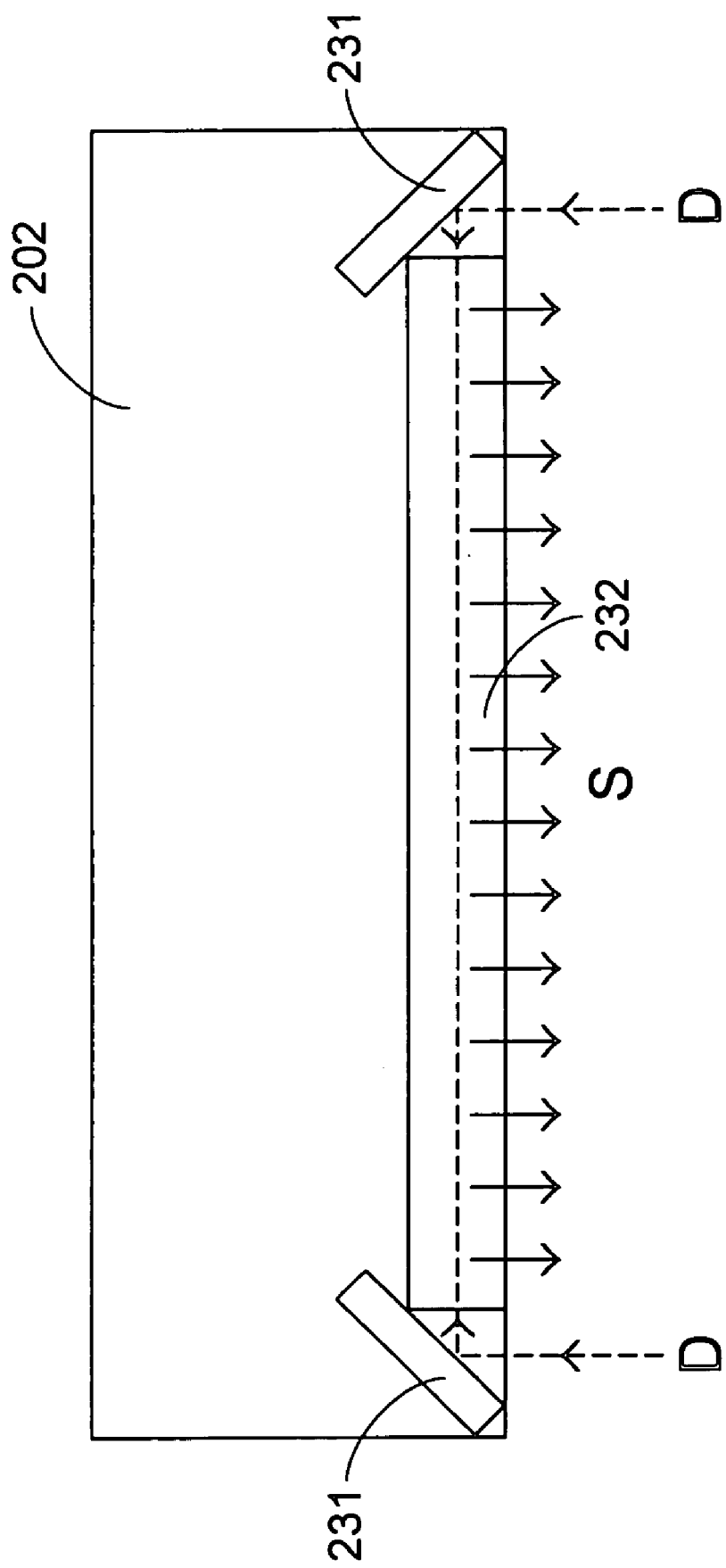
FIG. 3(b) is a schematic side view of the light-guiding member of the image scanner of FIG. 3(a)

As shown in FIGS. 3(a) and 3(b), the light-guiding member 23 comprises two reflective mirrors 231 and a light-guiding plate 232 between the two reflective mirrors 231. The reflective mirrors 231 serve as light inlet of the light emitted from the active light source 221, and the positions and orientations thereof are specially designed to reflect the light toward the light-guiding plate 232, as indicated by the dashed arrows D. The light-guiding plate 232, once receiving the light emitted from the active light source and reflected by the reflective mirrors 231, scatters the light downwards, as indicated by the solid arrows S to penetrate through the scanned object 25. The light penetrating through the scanned object 25 is then received the carriage module so as to perform the transmissive scanning.

Figure 4A:
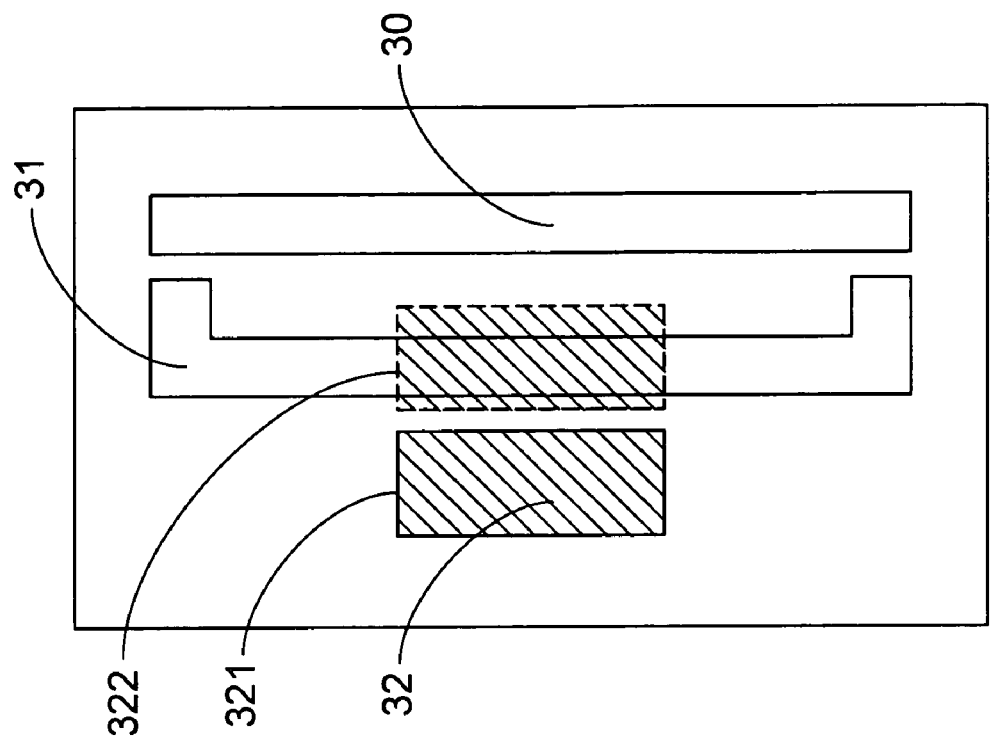
FIGS. 4(a)~4(b) are schematic diagrams of carriage modules for illustrating two exemplified configurations of the active light source partially masked in the transmissive mode of the dual-mode scanner according to the present invention.
Figure 4B:
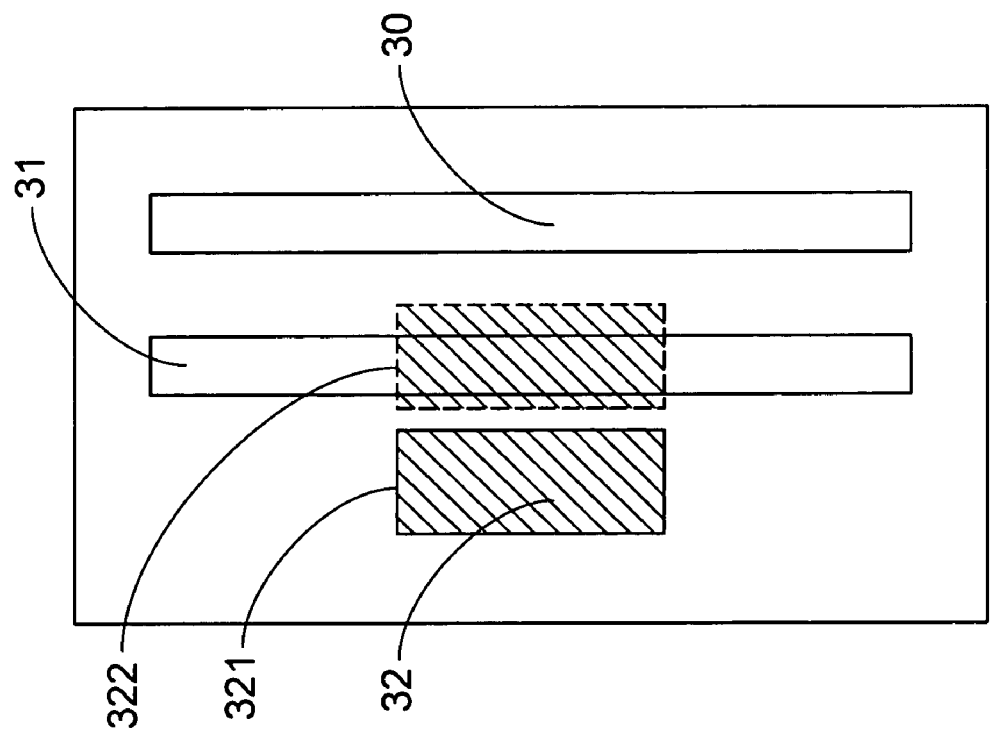
Figure 5B:
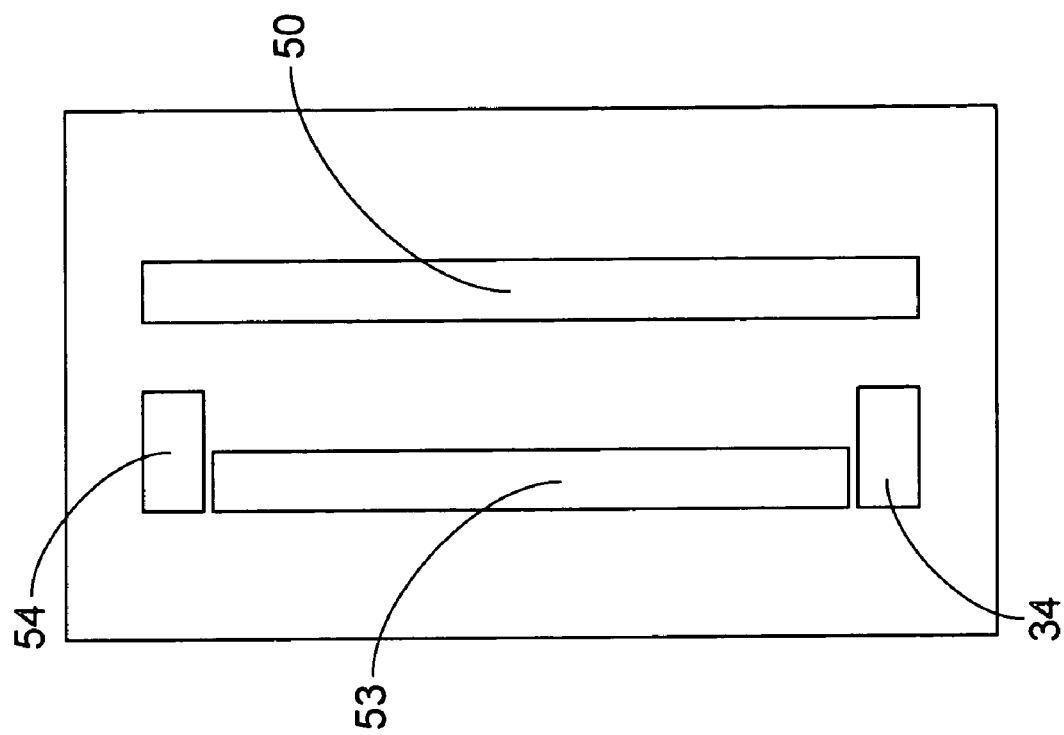
FIGS. 5(a)~5(b) are schematic diagrams of carriage modules for illustrating two exemplified configurations of the active light source partially turned off in the transmissive mode of the dual-mode scanner according to the present invention.
Figure 5A:
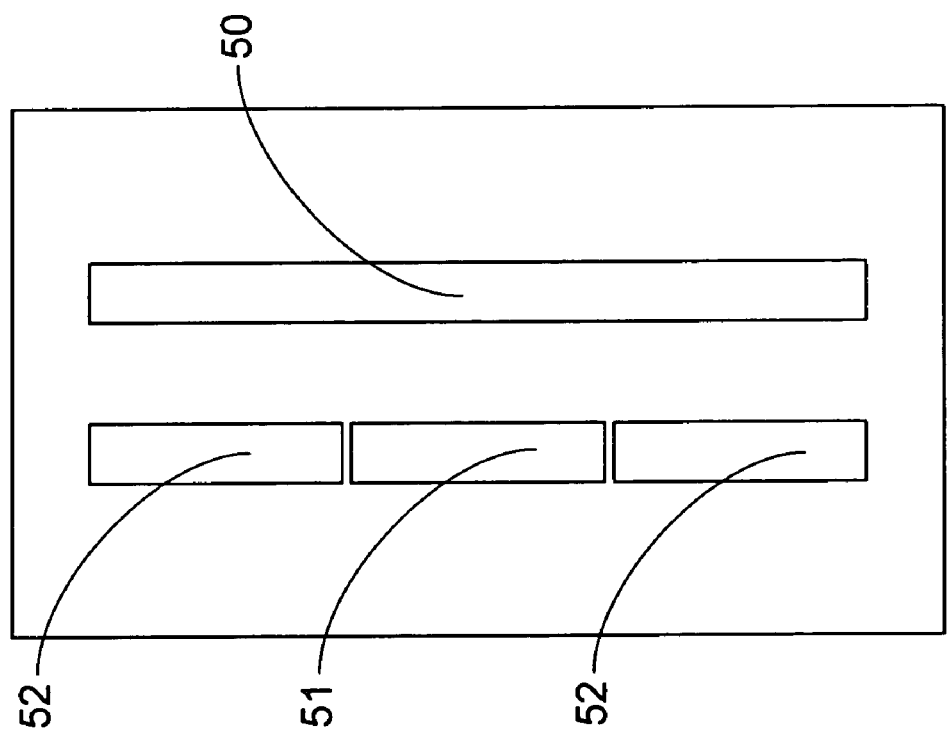

It is to be noted that in the transmissive mode, the light projected on the scanned object should only come from the light-guiding member other than the active light source. Therefore, there is preferably no illumination of the active light source right under the specified region of the scanning platform for placing the light-transmissible object. In order to achieve this purpose, the portion of the active light source corresponding to the specified region of the scanning platform is, for example, masked or turned off according to the present invention. FIGS. 4(a)~4(b) and 5(a)~5(b) are schematic views illustrating four exemplified configurations of the active light source for masking or turning off that portion. In FIG. 4(a), the carriage module has a scanning window 30 and a linear cathode-ray tube lamp 31 having a shape similar to that of the scanning window 30 and serving as the active light source. The carriage module further comprises a light mask 32 positioned at a position 321 in the reflective scanning mode, and movable to a position 322 covering a portion of the lamp 31 under the designated region in the transmissive scanning mode, thereby preventing the scanned object from direct illumination of the active light source. The carriage module of FIG. 4(b) is similar to that shown in FIG. 4(a) except that a U-shaped lamp 31 is used as the active light source. In FIG. 5(a), the carriage module has a scanning window 50 and a middle and two side illuminating units 51 and 52 are arranged as the active light source. The middle illuminating unit 51 is turned off while the side illuminating units 52 are turned on in the transmissive scanning mode in order to prevent the scanned object from direct illumination of the active light source. The carriage module of FIG. 5(b) is similar to that shown in FIG. 5(a) except that a U-shaped lamp comprising a middle and two side illuminating units 53 and 54 as arranged is used as the active light source. Likewise, the middle illuminating unit 53 is turned off while the side illuminating units 54 are turned on in the transmissive scanning mode.

Figure 6:
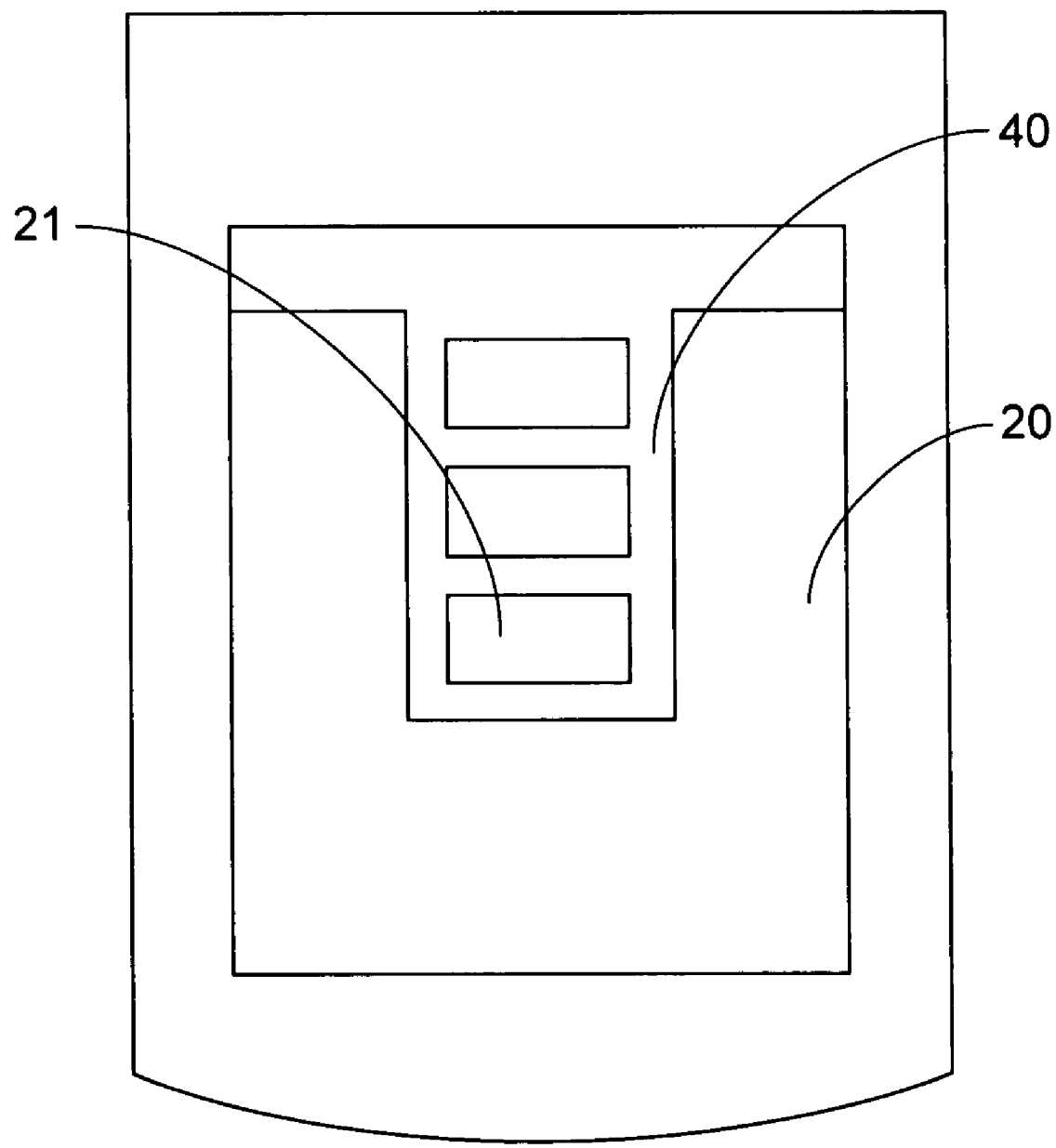
FIG. 6 is a schematic top view illustrating the attachment of a holder for simultaneously positioning one or more transparent objects to the scanning platform.

If the scanned object is small in size, e.g. a slide or a film, a holder 40 capable of supporting a plurality of objects 21 in position at the same time can be optionally attached to the scanning platform 20 to improve the scanning efficiency, as shown in FIG. 6. The holder 40 can be detached from the scanning platform 20 when a large-size object is to be scanned.

From the above description, the dual-mode scanner of the present invention is capable of scanning both transmissive and reflective objects with a singe light source. Thus, the cost and the size of the scanner can be effectively reduced.

The present invention can be applied to any scanning apparatus performing both reflective and transmissive scanning. For example, the scanning apparatus can be an image scanner, a multifunction peripheral machine, etc.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A dual-mode scanning apparatus capable of scanning both transmissive and reflective objects, comprising:
   a scanning platform for placing thereon an object to be scanned;
   a carriage module arranged under said scanning platform, and comprising a light source for emitting light and an image sensor, the light being reflected by said object toward said image sensor in a reflective scanning mode; and
   a light-guiding member arranged over said scanning platform for guiding the light emitted by said light source to said object, the light guided by the light-guiding member penetrating through said object toward said image sensor in a transmissive scanning mode.

2. The dual-mode scanning apparatus according to claim 1 wherein said scanning platform is transparent.

3. The dual-mode scanning apparatus according to claim 1 wherein said light source is a linear lamp.

4. The dual-mode scanning apparatus according to claim 1 wherein said light source is a U-shaped lamp, wherein a middle portion of the U-shaped lamp is turned off in the transmissive scanning mode.

5. The dual-mode scanning apparatus according to claim 1 wherein said object is placed at a designated region on said scanning platform in said transmissive scanning mode.

6. The dual-mode scanning apparatus according to claim 5 wherein said carriage module further comprises a light mask covering a portion of said light source corresponding to said designated region in said transmissive scanning mode in order to prevent said object from direct illumination of said light source.

7. The dual-mode scanning apparatus according to claim 5 wherein said object is positioned with a holder that is attachable to and detachable from said designated region of said scanning platform.

8. The dual-mode scanning apparatus according to claim 5 wherein said light source comprises a plurality of segmental illuminating units, at least one of which is positioned corresponding to said designated region and turned off in said transmissive scanning mode in order to prevent said object from direct illumination of said light source.

9. The dual-mode scanning apparatus according to claim 8 wherein said plurality of illuminating units are arranged as a linear light source.

10. The dual-mode scanning apparatus according to claim 8 wherein said plurality of illuminating units are arranged as a U-shaped light source.

11. The dual-mode scanning apparatus according to claim 1 wherein said light-guiding member comprises:
    at least one reflective element for reflecting the light emitted by said light source in a specified direction; and
    a light-guiding plate arranged in said specified direction relative to said reflective element for receiving the light emitted by said light source and reflected by said reflective element, and scattering the light to penetrate through said object in said transmissive scanning mode.

12. The dual-mode scanning apparatus according to claim 1 being an image scanner.

13. The dual-mode scanning apparatus according to claim 1 being a multifunction peripheral machine.

14. A dual-mode scanning apparatus capable of scanning both transmissive and reflective objects, comprising:
    a scanning platform for placing thereon an object to be scanned;
    a carriage module arranged under said scanning platform, and comprising a light source for emitting light, the light being reflected by said object toward enter said carriage module in a reflective scanning mode; and
    a light-guiding member arranged over said scanning platform for guiding the light emitted by said light source to said object, the light penetrating through said object toward said carriage module in a transmissive scanning mode;
    wherein said light source includes a first portion positioned under a light inlet of said light-guiding member and a second portion positioned under said object, and substantially only the light emitted from the first portion of said light source penetrates through said scanning platform in said transmissive scanning mode.

15. The dual-mode scanning apparatus according to claim 14 wherein said carriage module further comprises a light mask moving to cover said second portion of said light source in said transmissive scanning mode while moving to expose said second portion of said light source in said reflective scanning mode.

16. The dual-mode scanning apparatus according to claim 14 wherein said second portion of said light source is turned off in said transmissive scanning mode while being turned on in said reflective scanning mode.

17. The dual-mode scanning apparatus according to claim 14 wherein said first portion of said light source includes at least one illuminating unit, and said second portion of said light source includes at least two illuminating units positioned at opposite sides of said first portion.

18. The dual-mode scanning apparatus according to claim 14 wherein said light-guiding member comprises:
   at least one reflective element serving as said light inlet for receiving and then reflecting the light emitted by said light source in a specified direction; and
   a light-guiding plate arranged in said specified direction relative to said reflective element for receiving the light emitted by said light source and reflected by said reflective element, and scattering the light to penetrate through said object.

19. A dual-mode scanning apparatus capable of scanning both transmissive and reflective objects, comprising:
   a scanning platform for placing thereon an object to be scanned;
   a carriage module arranged under said scanning platform, and comprising a light source for emitting light, the light being reflected by said object toward said carriage module in a reflective scanning mode;
   a light inlet for receiving and then reflecting the light emitted by said light source in a specified direction; and
   a light-guiding element arranged in said specified direction relative to said reflective element for receiving the light emitted by said light source and reflected by said reflective element, and scattering the light to penetrate through said object toward said carriage module in said transmissive mode, wherein said light source includes at least three illuminating units, and a middle one of said three illuminating units is turned off in said transmissive scanning mode in order to prevent said object from direct illumination of said light source.

20. The dual-mode scanning apparatus according to claim 19 wherein said light inlet is a reflective mirror, and said light-guiding element is a light-dispersion plate.

* * * * *

UNITED STATES PATENT AND TRADEMARK OFFICE
CERTIFICATE OF CORRECTION

PATENT NO.         : 7,589,870 B2                                                   Page 1 of 1
APPLICATION NO.    : 10/827483
DATED              : September 15, 2009
INVENTOR(S)        : Pai It is certified that error appears in the above-identified patent and that said Letters Patent is hereby corrected as shown below:

Column 6
Line 42, delete "enter"

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,589,870 B2  Page 1 of 1
APPLICATION NO. : 10/827483
DATED : September 15, 2009
INVENTOR(S) : Nien-Hua Pai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1549 days.

Signed and Sealed this

Twenty-first Day of September, 2010

David J. Kappos
*Director of the United States Patent and Trademark Office*